United States Patent [19]

Schneider

[11] Patent Number: 4,624,691
[45] Date of Patent: Nov. 25, 1986

[54] CYCLONE SEPARATORS TO PREVENT OR REDUCE CLOGGING

[75] Inventor: Horst W. Schneider, Covina, Calif.

[73] Assignee: Varnas Enterprises, Monrovia, Calif.

[21] Appl. No.: 707,674

[22] Filed: Mar. 4, 1985

[51] Int. Cl.[4] ............................................. B01D 45/12
[52] U.S. Cl. ................................. 55/396; 55/459 B; 55/458; 210/512.1
[58] Field of Search .............................. 55/396–399, 55/459 R, 459 A, 459 B, 459 C, 459 D, 461, 458; 209/144; 210/512.1

[56] References Cited

U.S. PATENT DOCUMENTS

| | | | |
|---|---|---|---|
| 2,489,618 | 11/1949 | Cantin | 55/396 X |
| 2,582,423 | 1/1952 | Foley | 55/398 |
| 2,786,547 | 3/1957 | McCartney | 55/461 X |
| 3,349,548 | 10/1967 | Boyen | 210/512.1 X |
| 3,501,001 | 3/1970 | Muller et al. | 210/512.1 X |
| 3,953,184 | 4/1976 | Stockford et al. | 55/458 |

FOREIGN PATENT DOCUMENTS 0128113 12/1984 European Pat. Off. .......... 55/459 R

*Primary Examiner*—Charles Hart
*Attorney, Agent, or Firm*—Christie, Parker & Hale

[57] ABSTRACT

A cyclone separator and an installation of such a separator in a processing vessel are set forth which conditions the inlet flow to prevent the depositing of particulates at the cyclone inlet. The separator is disposed in a cylindrical enclosure represented by the processing vessel. The enclosure has an inner surface and defines a chamber to receive the gas and entrained particulates. Disposed within the chamber is the smaller diameter cyclone separator having a cylindrical wall. To admit gas, the separator wall has an inlet, one side boundary of which is arranged tangential with the enclosure inner surface, the other side boundary being spaced from the surface to define an axially extending, scroll-shaped envelope between the enclosure inner surface, the cyclone wall and its inlet. A flow conditioning surface is provided between the vessel inner surface and cyclone wall, the flow conditioning surface having a trailing edge at the cyclone inlet and a leading edge to accelerate the gas flow preferably to a velocity or a range of velocities acceptable by the cyclone for efficient separation without the creation of wake turbulents, eddies or the like, which would result in the deposit of particulates at the cyclone separator unit. A flow directing surface may be disposed within the cyclone to turn the gas stream and impart an accelerated downward velocity to the particulates as they flow around the cyclone.

7 Claims, 11 Drawing Figures

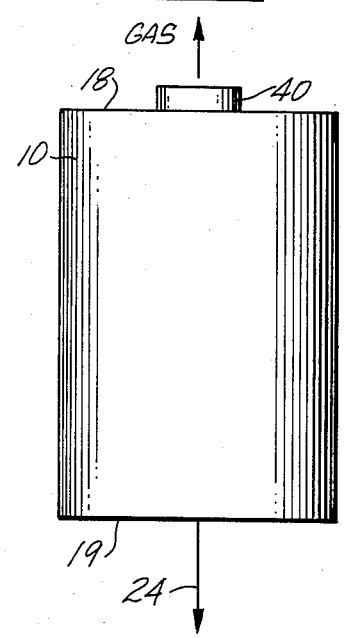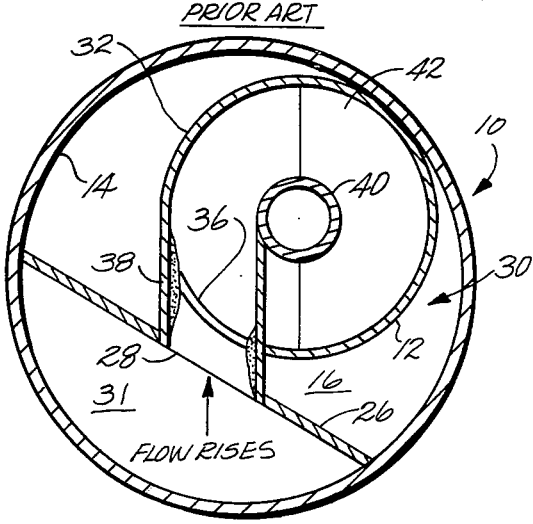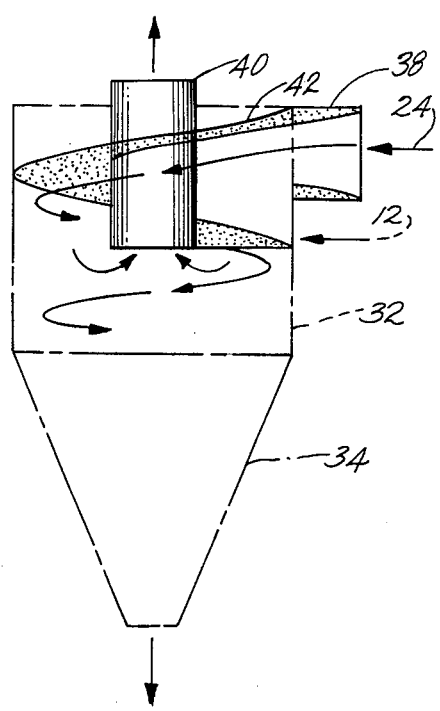

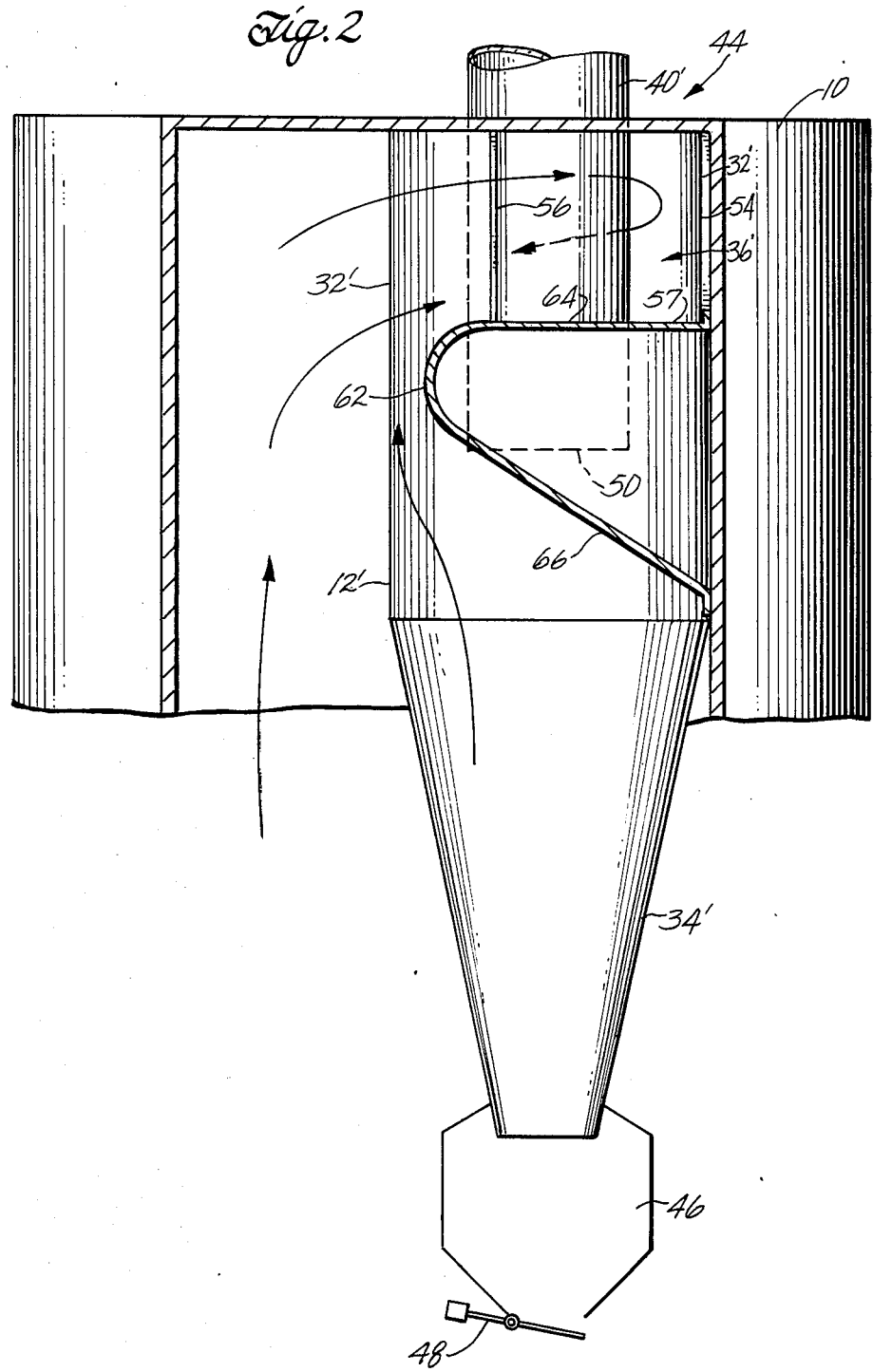

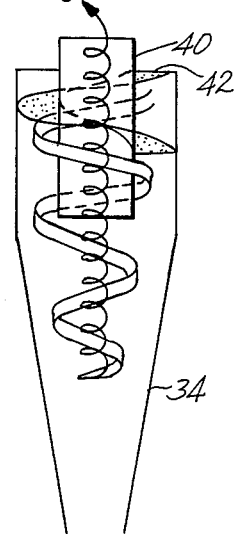
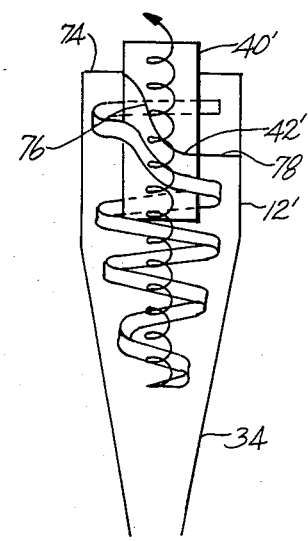
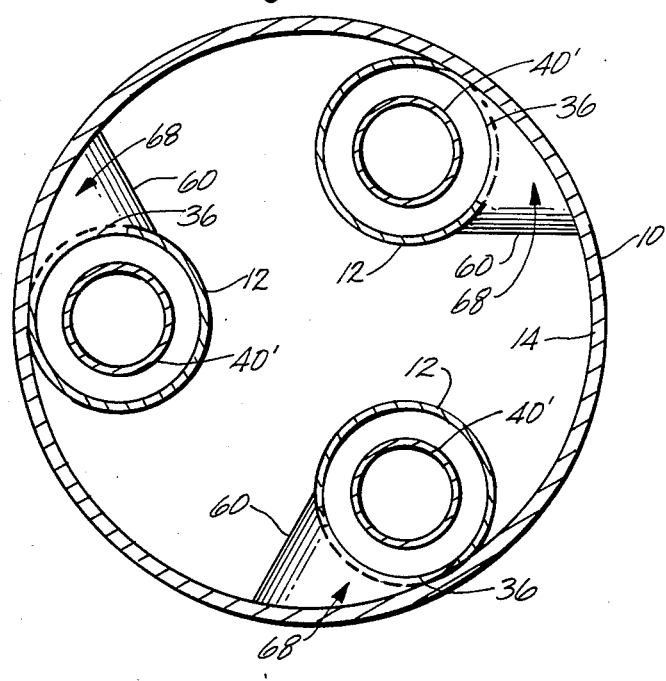

CYCLONE SEPARATORS TO PREVENT OR REDUCE CLOGGING

FIELD OF THE INVENTION

This invention relates to separators adapted to be disposed in larger vessels for separating particulates from a gas.

BACKGROUND OF THE INVENTION

Cyclone separators are often used when is desired to separate particulates from a gas stream. By design, the cyclone separator induces the gas stream to flow in a vortex fashion so that the particulates are thrown outwardly by centrifugal force against the sides of the separator. These particulates find their way to a collector bin or the like at the bottom of the cyclone. The gas, freed of the entrained particulates, is discharged through a vortex finder tube directed into the center of the vortex where the gas is substantially free of particulates.

It has been known to locate a cyclone separator within a larger processing vessel or the like. The gas and entrained particulates enter the vessel and, due to differential pressure, enter the cyclone separator disposed within the vessel which causes the gas stream to swirl in a vortex fashion to remove the particulates therefrom.

A problem with such arrangements according to the prior art is that, to keep production costs low, a simple opening is provided to the cyclone separator to receive the gas stream. Often the opening is located proximate the axis of the larger processing vessel. Upon entering the processing vessel, typically through a bottom inlet, the stream flows in and through the vessel before entering the cyclone, usually through a simple opening provided therefor. As the gas stream flows through the simple opening wake turbulents cause eddies to be formed at cyclone inlet. Where the particulates are of a sticky or tacky nature such as, for example, in oil shale processing, these eddies tend to result in the particulates being deposited and accumulating at the cyclone inlet. Gradually, as the eddies deposit more particulates the cyclone inlet constricts choking the gas flow into the cyclone and producing more turbulents and eddies which accelerate the particulate build-up. Choking of the gas flow into the cyclone also reduces the velocity of the vortex in the cyclone leading to inefficient particulate separation. Eventually, the process must be shut down or the vessel removed service to clear the cyclone inlet.

SUMMARY OF THE INVENTION

There is, therefore, provided in the practice of the present invention a cyclone separator and an installation of such a separator in a processing vessel which conditions the inlet flow to prevent the depositing of particulates at the cyclone inlet. The separator and installation do not significantly impact the cost of the separator or vessel.

Toward this end, a cylindrical enclosure representing a processing vessel or the like is provided. The enclosure has an inner surface and defines a chamber to receive the gas and entrained particulates. Disposed within the chamber is a smaller diameter cyclone separator having a cylindrical wall. To admit gas, the separator wall has an inlet, one side boundary of which is arranged tangential with the enclosure inner surface, the other side boundary being spaced from the surface to define an axially extending, scroll-shaped envelope between the enclosure inner surface, the cyclone wall and its inlet. The upper end of the envelope terminates at an end wall which is also the upper boundary of the cyclone inlet.

To condition the flow of gas into the cyclone and prevent the deposit of particulates a flow controlling surface is provided between the vessel inner surface and cyclone wall, the flow controlling surface having a trailing edge at the cyclone inlet and a leading edge. The flow controlling surface, in cooperation with the end wall, gradually reduces the cross-sectional area of the envelope to define, in essence, a convergent duct to accelerate the gas flow preferably to a velocity or a range of velocities acceptable by the cyclone for efficient separation without the creation of wake turbulents, eddies or the like, which would result in the deposit of particulates at the cyclone separator inlet. As the gas flows into the cyclone separator, it swirls in a vortex fashion to separate the particulates from the gas stream. The separator particulates are collected and removed from the cyclone separator while the gas, free of the particulates, is discharged through an axially arranged finder tube.

In a further embodiment of the present invention, the cyclone wall is formed in a helical fashion at the inlet to match the scroll envelope and extend to the tube to further condition the gas flow. Additionally, a flow directing surface may be disposed within the cyclone to turn the gas stream and impart a downward velocity to the particulates as they flow around the cyclone. Imparting the downward velocity urges the separator particulates toward the bottom of the cyclone for collection and promotes separation at a region within the separator where velocities are such that efficient separation can take place.

The controlling of the flow has been found to be advantageous in preventing wake turbulence and the like at the cyclone inlet thereby eliminating or reducing the deposits of particulates thereat. Further, the cyclone according to the present invention, enhances the efficiency at which the particulates are separated from the gas.

BRIEF DESCRIPTION OF THE DRAWINGS

These and other features and advantages will become apparent as the same become better understood with reference to the specification, claims and drawings wherein:

FIG. 1A is a side view of the processing vessel incorporating a cyclone separator according to the prior art;

FIG. 1B is a top section view of the processing vessel and cyclone separator according to FIG. 1A;

FIG. 1C is a schematic view of the cyclone separator according to the prior art, including a spiral surface to direct the gas flow;

FIG. 2 is a section view of a portion of the processing vessel and cyclone separator according to the present invention;

FIG. 6A is a schematic view showing the operation of a cyclone separator according to the prior art.

FIG. 6B is a schematic view showing the operation of the cyclone separator according to FIG. 5;

FIG. 8 is a top section view of a vessel incorporating a plurality of cyclone separators.

DETAILED DESCRIPTION

Figure 3:
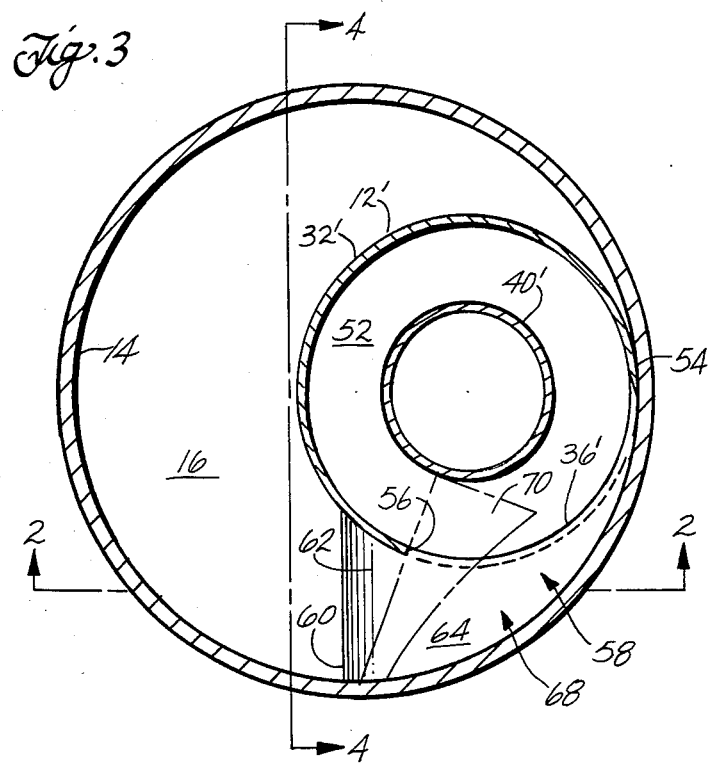
FIG. 3 is a top section view of the processing vessel and cyclone separator according to the present invention.

Turning to FIGS. 1A-1C a processing vessel 10 is shown which includes a cyclone separator 12 according to the prior art. The vessel 10 is cylindrical having an inner surface 14 and defining a cylindrical chamber 16. The vessel has a top 18 and bottom 19 to close the chamber 16 from the atmosphere. To admit a gas stream having entrained particulates, the vessel 10 is provided with a feed duct 24 which may be arranged as required to introduce the gas stream into the bottom of the vessel 10.

To remove the particulates from the gas stream 24, the separator 12 is disposed in the chamber 16. One arrangement according to the prior art is to provide a supporting wall 26 arranged in a chordal fashion parallel to the axis of the vessel 10, the wall 26 having an opening 28 therein. The wall 26 defines a subchamber 30 which houses the separator 12 and another chamber defining a chimney 31. The separator 12 is supported between the wall 26 and the vessel inner surface 14 and/or may be suspended and supported from the top 18.

The cyclone separator 12, as shown in FIGS. 1B and 1C, is well known in the art. The separator 12 includes a cylindrical closed shell 32 having a conical bottom portion 34. The shell 32 near the upper end of the separator 12 is provided with a tangentially arranged inlet 36 to admit the gas stream into the separator 12. An inlet duct 38 extends between the inlet 36 and the opening 28 of the wall 26. As shown in FIG. 1B, the inlet and inlet duct are arranged such that the inlet duct makes an acute angle with respect to the wall 26. Coaxially disposed in the separator 12 is a vortex finder tube 40 which extends into the separator to a location below the inlet 36 to provide an outlet for the gas from the separator.

In operation, the gas-particulate stream 24 is supplied to the vessel 10, the stream being driven by the differential pressure across the separator 12 and thereby the closed vessel 10. Since the tube 40 is at a lower pressure, which may be atmospheric pressure or a slight positive pressure or at a vacuum, and the gas feed is at a higher pressure, the stream 24 enters the vessel 10 and flows upwardly within the chimney 31. The stream eventually finds its way to and turns to enter the opening 28, inlet duct 38 and inlet 36 to the separator 12. Passing through the tangentially arranged inlet duct 38 and inlet 36, the stream begins to swirl in a vortex fashion. The vortex action of the gas imparts centrifugal force to the particulates which are thrown outwardly against the wall of the separator 12. The particulates due to gravity migrate to the bottom portion 34 of the separator for collection for processing or removal. The gas, freed of substantial amounts of particulates, passes at the axis of the vortex to the tube 40 and is removed from the separator 12 and vessel 10.

To urge the particulates downwardly for collection a spiral flow direction surface 42 is provided in the separator 12 about the tube 40. As schematically shown in FIGS. 1C and 6A, the surface imposes a uniform downward component to the velocity of the gas stream and its particulates, causing the particulates to migrate downwardly to the bottom portion 34 of the separator for collection, whereas the gas makes its way to the tube 40. The spiral surface 42 is at a substantially constant angle with respect to radial (horizontal in FIG. 1C) extending planes which pass through the axis of the separator 12.

The arrangement of the vessel 10 and separator 12 according to the prior art has experienced problems, particularly where the particulates are of a sticky or tacky nature. One, and perhaps the most pervasive problem, is that of particulate accumulation or buildup at the separator inlet duct 38 and inlet 36. As the stream 24 turns from the chimney 31 and enters the opening 28, turbulents are created. These turbulents result in the creation of eddies in and along the inlet duct 38 and at the cyclone inlet 36. Further, these eddies tend to deposit particulates along the inlet duct 38, at the inlet 36 and within the separator 12 especially where the particulates are of a tacky nature. Such a build-up is exemplified in FIG. 1B. Another problem is the low efficiency of the separator 12 of such an arrangement. The efficiency of separation of particulates by a cyclone separator is closely associated with the velocity of the gas/particulate stream entering the separator. By the arrangement according to the prior art including the sharp opening 28 and the turbulents and pressure drop associated therewith, the velocity of the gas entering the cyclone separator is adversely affected. The build-up of the particulates chokes the gas flow, slowing the gas-particulate stream and further affecting the efficiency of the separator.

Figure 4:
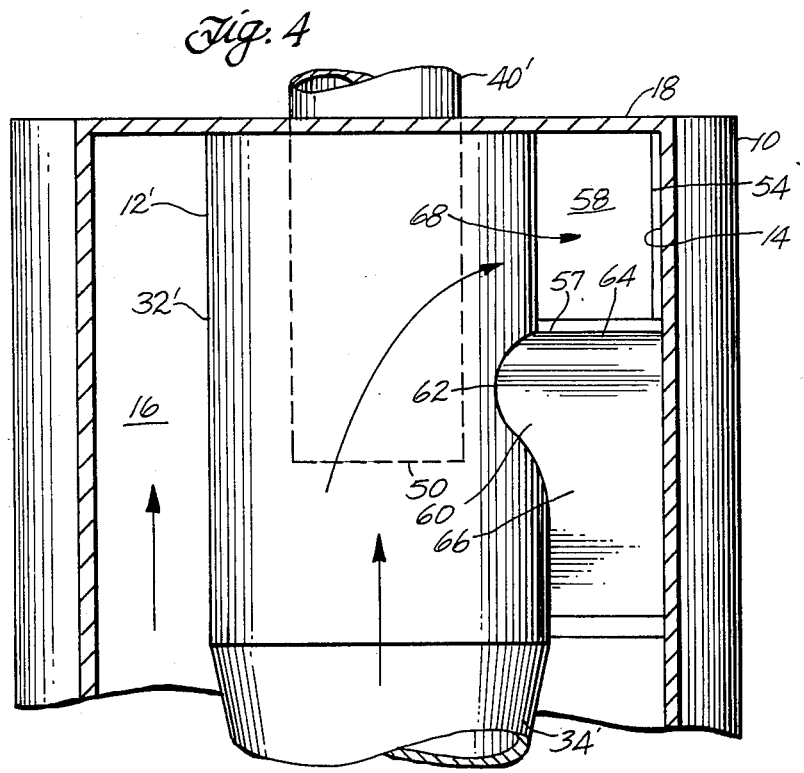
FIG. 4 is a partial side section view of the vessel and cyclone separator taken along line 4—4 of FIG. 3.

Turning to FIGS. 2-4, a device 44 for separation of particulates from a gas stream is shown according to one embodiment of the present invention. The device 44 includes a cylindrical outer vessel which may be embodied as the processing vessel 10 as described above.

The vessel 10 has a cylindrical inner surface 14 and defines a chamber 16 adapted to receive the gas-particulate stream 24 and to house a separator 12'. A feed duct (not shown) is arranged at the bottom of the vessel and chamber 16 to supply the gas-particulate stream into the vessel 10.

The cyclone separator 12' has a cylindrical shell 32' which extends from the top 18 of the vessel 10 to a conical bottom portion 34'. The bottom portion 34' terminates at a bin 46 adapted to collect and retain the separator particulates. A gate 48 at the bin 46 allows the bin 46 to be emptied of particulates for processing or disposal as desired. Axially arranged and extending into the separator 12' is a vortex finder tube 40' having an open end 50 located within the shell 32', the tube 40' extending outwardly from the vessel 10 for removing the particulate freed gas from the device 44. The region between the shell 32' and the tube 40' defines an annular swirl chamber 52.

As shown in the drawing, the separator 12' is arranged eccentrically within the chamber 16, the shell 32' abutting the vessel inner surface 14 substantially along a line represented by abutment 54 in FIG. 3. When viewed in a plan cross-section as shown in FIG.

3, the abutment 54 and axis of the separator and finder tube are arranged along a radial line emanating from the axis of vessel 10.

To admit the gas-particulate stream into the separator 12', the separator 12' has an inlet 36' one side boundary of which is defined at the abutment 54 whereas the other side boundary of which defines an edge 56. The abutment 54 and edge 56 are preferably spaced apart by angle which is in the range of between 122° to 160°. The inlet 36' has a lower boundary 57 spaced from the top 18. As can be appreciated from FIG. 3, the arrangement of the separator 12' within the vessel 10 defines a scroll-shaped passage 58 between the separator 12' and the vessel inner surface 14. This passage 58 communicates with the inlet 36'. By the arrangement of the separator 12' within the vessel 10, the cross-sectional area passage 58 decreases as the stream 24 approaches the inlet 36'.

To cooperate with the arrangement of the separator 12' in the vessel 10 which defines the scroll-shaped passage 58, a flow controlling fairing 60 is disposed across the passage 58 between a separator 12' and the inner surface 14. The fairing 60 has a rounded leading edge 62 located upstream of and extending to the edge 56 of the inlet 36' for the separator 12'. A substantially flat upper portion 64 extends from the leading edge 62 to the abutment 54, the upper portion 64 registering with the lower boundary 57 of the separator inlet 36'. Opposite the upper portion 64 the fairing 60 has a lower portion 66 which is directed circumferentially and downwardly between the separator 12' and the vessel inner surface 14. While the drawings show the lower portion 66 as being angled (FIG. 2) it is to be understood that any suitable configuration may be used. The fairing, in addition to providing the functions described below, is well suited to support the separator within the vessel 10.

The fairing 60 cooperates with the vessel inner surface 14, top 18, and separator shell 32' to define a smooth, convergent duct 68 which is arranged tangential and leads to the separator inlet 36'. The gas stream is controlled by the fairing 60 and the cooperative confines of the convergent duct 68 so that the gas stream is gradually accelerated to a velocity suitable for efficient separation by the separator. Further, the gradual acceleration prevents or reduces the formation of wake turbulents and eddies which, according to devices of the prior art, have contributed to the deposition of particulates and clogging of the device. As best shown in FIG. 3, it is believed that the gas stream assumes a velocity profile 70 as a result of the curved convergence of the duct 68 and overall wall drag on the gasparticulate stream. The fairing 60 is contoured and the leading edge is located so that a desired velocity or range of velocities are present and maintained at the separator inlet 36'. Further, as discussed above, the gradual acceleration of the gas stream tends to prevent accumulation of particulates at the separator not only due to the desired velocity being maintained but also due to the gradual converging nature of the duct which tends to prevent the creation of wake turbulents and eddies. Accordingly, the duct 68 and separator inlet 36' remains substantially clear of accumulated particulates even should those particulates be of a sticky or tacky nature.

Upon entering the separator 12' the gas-particulate stream swirls about the tube 40' casing the particulates outwardly against the shell 32'. The separated particulates migrate downwardly into the bottom portion 34' and into the bin 46 for removal from the device 44. The gas from which the particulates have been removed finds its way to the tube opening 50 and exits from the separator 12' and from the device 44. Again, due to the converging nature of the curved duct 68 and the orientation of the separator inlet 36', separation of the particulates takes place within the separator as opposed to the particulates being deposited at the channel and inlet.

Figure 5:
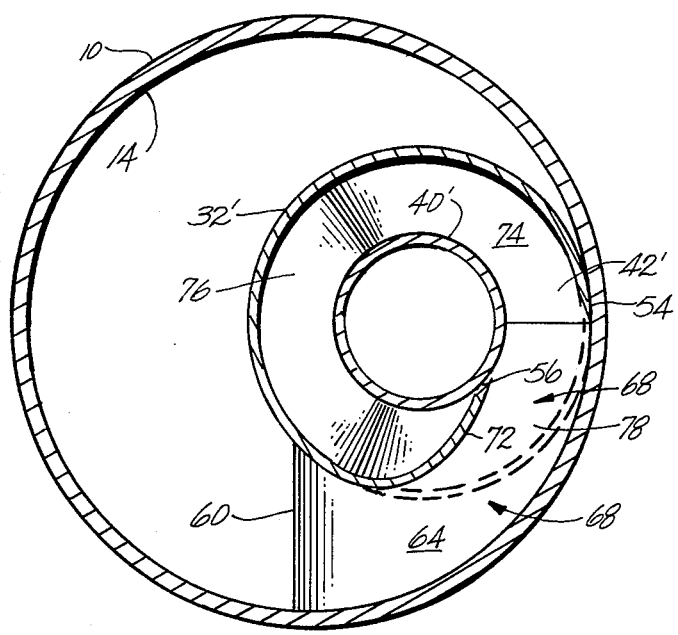
FIG. 5 is a top section view of the processing vessel including a further embodiment of the cyclone separator.
Figure 7:
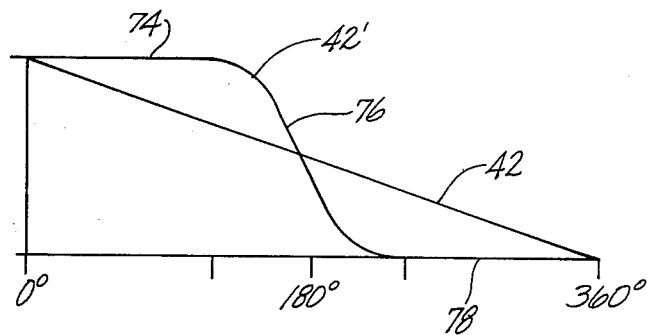
FIG. 7 graphically illustrates axial distance versus degrees around the circumference of the separator for the separator of FIG. 5 and of the prior art separator of FIG. 1C.

Turning to FIGS. 5-7, a further embodiment of the separator 12' is shown. In this embodiment, the separator shell 32' at the inlet 36' is turned inwardly as by a bend 72 to locate the edge 56 adjacent the tube 40'. By this construction the convergent duct, shown as 68' in FIG. 5, guides and provides a smooth entrance for the gas and thereby a gradual transition from the chamber 16 to the inlet 36' and to the interior of the separator 12' in comparison to the embodiment discussed above and as shown in FIG. 3. By virtue of the bend 72 and the smooth transition, eddies and turbulents which may have been created at the edge 56 of the embodiments shown in FIGS. 2 and 3 are reduced thereby further reducing depositing of particulates at the inlet 36.

Turning to FIGS. 1C and 6A, the manner by which separation occurs according to the prior art will now be described. The gas stream upon entering the separator 12 begins to swirl downwards as induced by the flow directing surface 42. The gas stream then begins to accelerate as the stream spirals downwardly in the cone section of the separator. It has been found that where most efficient separation takes place, a certain amount of the gas stream bypasses this most efficient region of the vortex flow pattern and enters directly into the finder tube 40. This bypassing flow carries with it particulates which were not removed by the separation and must otherwise be accounted for.

To prevent such bypassing of flow, the cyclone separator 12, in conjunction with either the duct 68 of FIGS. 2-4 or 68' of FIG. 5, may include a flow directing surface 42' as shown in FIGS. 5 and 6B. The surface 42' is disposed in the annular swirl chamber 52 for the separator 12 and has a first portion 74 arranged, to extend horizontally from the channel 68 (or 68') for approximately 120° of arc around the finder tube 44'. From the first portion 74, the surface 42' bends downwardly in an S-type fashion to an angle of approximately 45° with respect to the horizontal, the downwardly directing portion defining a ramp 76. The ramp 76 extends downwardly, at approximately 45° with respect to the horizontal, the ramp turning to define a substantially horizontal second portion 78 beginning at approximately 240° from the inlet 36 and extending around the finder tube 44' to terminate at about 360° from the inlet 36.

A comparison between the surface 42' described with reference to FIGS. 5 and 6B and the surface 42 with reference to the prior art devices of FIGS. 1A-C and 6A is depicted in FIG. 7. As can be appreciated, the prior art surface 42 is uniform in slope as it is spirally wrapped from the finder tube whereas the surface 42' includes three regimes causing the stream to flow in a first horizontal, spiral fashion. The flow is then directed downwardly at approximately a 45° angle by the ramp 76 and thereafter is free to flow again in a horizontal fashion as constrained by the second portion 78.

The advantage of the surface 42' over the prior art, uniform flow surface is that the abrupt diversion of the flow by the ramp 76 imparts the desired downward component to the particulates in the gas stream and acts to somewhat accelerate the stream to an increased velocity to, in turn, enhance the efficiency of the separation of the particulates from the gas stream and prevent bypass which occurs at lower velocities. As can be appreciated, as the flow stream flows about the finder tube 44' and encounters the ramp 76, the stream is diverted and accelerated to cast the particulates therefrom. This acceleration takes place at a region within the separator where the initial velocity of the stream is already relatively high and where efficient separation can take place. As can be appreciated, the cooperation between the convergent duct 68 or 68' with the surface 42' provides for the efficient separation of particulates, particularly when they are of a sticky or tacky nature. The gas, free from particulates finds its way to the finder tube 44 for removal from the separator 12 and device 44.

Turning to FIG. 8, an embodiment of device 44' for a separation of particulates from high mass flow gas streams is shown. In this embodiment, three separators 12 are disposed within the vessel 10, each separator including the above-described convergent duct 68, inlet 36 and finder tube 44. If desired each or some of the cyclones may include the bend 72 and/or the surface 42' to provide for the separation of particulates.

While I have shown and described the embodiments of the present invention, it is to be understood that it is subject to many modifications of that departing from the spirit and scope of the invention as described herein. For example, the vessel 10 may include any number of separators 12 as desired.

What is claimed is:

1. A separator for removing particulates from a gas stream comprising:
    a cylindrical enclosure to receive gas streams;
    a cylindrical cyclone disposed within the enclosure, the cyclone having an inlet opening with upper and lower bounds, one side boundary adjacent the inner wall of the enclosure and the other side boundary spaced from the inner wall to define a scroll-shaped passage, the cyclone further including an axially arranged outlet tube and defining an annular swirl chamber within the cyclone about the outlet tube, said cyclone further including a flow directing surface disposed in the swirl chamber and defining the inlet opening upper bound, the flow directing surface having a first horizontal portion to direct the gas stream in a horizontal plane, a ramp portion to direct and accelerate the gas stream downwardly at an oblique angle with respect to said first portion and a second horizontal portion to re-direct the gas stream into a horizontal plane; and
    a flow controlling surface extending between the inner wall and the cyclone from the inlet opening to a leading edge, the surface being contoured to accelerate the gas stream as it flows to the inlet opening, the stream entering the cyclone to flow in a vortex fashion to separate the particulates, the particulate free gas being discharged from the outlet.

2. The separator of claim 1 wherein the flow controlling surface includes a rounded leading edge and a substantially flat upper surface registering with the opening lower bound, the rounded leading edge accelerating the gas stream.

3. The separator of claim 1 wherein the cyclone includes a spirally directed wall portion to locate the other side boundary adjacent the outlet tube.

4. The separator of claim 1 wherein, from the cyclone inlet the first portion, ramp and second portion each extend about 120° to 180° about the tube.

5. The separator of claim 1 wherein the angle defined between the one side boundary and the axis for the cyclone and the other side boundary and the axis for the cyclone is in a range of between 120° to 160°.

6. The separator of claim 1 wherein said ramp portion is arranged at an angle of 135° with respect to the first portion.

7. In a separator of the type having a closed enclosure to receive a gas stream for removal of particulates from the stream, the improvement comprising:
    a cylindrical cyclone disposed within and adjacent the inner wall of the enclosure, the cyclone having an inlet opening with upper and lower bounds, one side boundary adjacent the enclosure inner surface and the other side boundary spaced fronm said one side boundary, said cyclone and enclosure inner wall defining a scroll-shaped passage for the gas to flow to the inlet and enter the cyclone, the gas flowing in a vortex fashion to discard particulates therefrom, said cyclone further including an axially arranged outlet tube one end of which is disposed within the cyclone to receive the gas freed of particulates; and
    a flow controlling surface disposed across said scroll-shaped passageway and having a rounded leading edge and an upper surface extending from the leading edge to the inlet, the leading edge adapted to accelerate the gas stream as it approaches the inlet to prevent deposition of particulates at the inlet.

* * * * *